US007787062B2

(12) United States Patent
Tai et al.

(10) Patent No.: US 7,787,062 B2
(45) Date of Patent: Aug. 31, 2010

(54) REAR PROJECTION DISPLAY AND CIRCUIT AND METHOD FOR ADJUSTING IMAGE THEREOF

(75) Inventors: Wen-Chih Tai, Jhongli (TW); Shian-Jun Chiou, Taipei (TW); Chia-Lin Liu, Daya Township, Taichung County (TW); Chi-Neng Mo, Jhongli (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 1139 days.

(21) Appl. No.: 11/437,956

(22) Filed: May 19, 2006

(65) Prior Publication Data

US 2007/0268279 A1 Nov. 22, 2007

(51) Int. Cl.
*H04N 3/22* (2006.01)
*H04N 9/74* (2006.01)

(52) U.S. Cl. ...................................... 348/745; 348/580

(58) Field of Classification Search ......... 348/744–747, 348/805–808, 580–582; 345/204; *H04N 9/28, H04N 9/31, 3/22, 3/23, 9/74*
See application file for complete search history.

(56) References Cited

U.S. PATENT DOCUMENTS 5,465,121 A 11/1995 Blalock et al. .............. 348/744
5,764,311 A 6/1998 Bonde et al. ................ 348/749
6,222,593 B1 4/2001 Higurashi et al. ........... 348/745
6,416,186 B1 7/2002 Nakamura ................... 353/69
6,932,479 B2 8/2005 Kobayashi et al. ............ 353/69
7,109,981 B2 * 9/2006 Damera-Venkata et al. . 345/204
7,116,379 B2 * 10/2006 Suzuki ....................... 348/747

FOREIGN PATENT DOCUMENTS

JP 10-106933 4/1998
TW M245695 10/2004

OTHER PUBLICATIONS

Chinese Examination Report of Taiwan Application No. 095118384, dated Sep. 24, 2009.
Chinese Examination Report of Taiwan Application No. 095118384, dated on Jul. 15, 2009.

* cited by examiner

*Primary Examiner*—Sherrie Hsia
(74) *Attorney, Agent, or Firm*—J.C. Patents

(57) ABSTRACT

A circuit for adjusting image is adapted for rear projection display. The circuit for adjusting image includes a parameter input unit, a data buffer unit, and a geometry transfer unit. The parameter input unit is used to provide a vertical and a horizontal axis amendment parameters. The data buffer unit couples the parameter input unit to buffer the vertical axis amendment parameter and the horizontal axis amendment parameter. The geometry transfer unit is used to receive input frame data with a plurality of pixels, and then every pixel's vertical axis coordinates multiply the vertical axis amendment parameter to transfer every pixel to a new vertical axis coordinate, and every pixel's horizontal axis coordinates multiply the horizontal axis amendment parameter to transfer every pixel to a new horizontal axis coordinate. Finally, the transferred new vertical and horizontal axis coordinates are transmitted to a display for displaying images for users to watch.

7 Claims, 4 Drawing Sheets

REAR PROJECTION DISPLAY AND CIRCUIT AND METHOD FOR ADJUSTING IMAGE THEREOF

BACKGROUND OF THE INVENTION

1. Field of Invention

The present invention relates to an apparatus and a method for adjusting an image. More particularly, the present invention relates to an apparatus and a method for adjusting an image for a projection display.

2. Description of Related Art

With the great improvement of computer performance and the high development of the Internet and multimedia technology, at present, image information is mostly transferred by means of digital transmission instead of analog transmission. In order to fit the style of modern life, the volumes of video or image apparatuses are gradually becoming light and thin. Conventional cathode ray tube (CRT) displays have the shortcomings of being bulky, occupying more space, and being harmful to the eyes due to radiant rays when outputting images, though they are cheap.

Therefore, recently developed flat panel displays (FPDs), such as liquid crystal displays (LCDs), organic light-emitting diode displays (OLEDs), projection displays, digital light processing (DLP) displays, liquid crystal on silicon (LCOS) displays, or plasma display panels (PDPs), have gradually become predominant in display products.

However, images displayed on displays are quite important for users in spite of the development and progress of displays. Therefore, image adjustment technology for displays is always important not only for conventional cathode ray tube (CRT) displays, but also for a series of developing flat display panels.

FIG. 1 is a schematic view of the image distortion of a conventional display. With reference to FIG. 1, an image is displayed in the display 101 after a horizontal image signal and a vertical image signal are received and integrated in the display 101. However, not all images displayed in the display 101 are perfect, because the images may be bent, distorted, and so on. Therefore, multiple sets of adjustment parameters are built in the conventional display 101 for enabling users to manually adjust the images of the display, thereby displaying desired images for users.

Multiple sets of built-in amendment parameters include a horizontal geometry correction wave 103 and a vertical geometry correction wave 105. The horizontal geometry correction wave 103 comprises multiple sets of horizontal image adjusting types 103*a*-103*g* and the vertical geometry correction wave 105 also comprises multiple sets of vertical image adjusting types 105*a*-105*g*.

An image adjustment method for a front projection display is disclosed in U.S. Pat. No. 5,465,121. When a front projection display projects images to a non-vertical surface, the image is distorted. Therefore, an apparatus for adjusting an image distortion is developed for the front projection display. For the conventional adjustment apparatus, an image pattern for adjustment is provided as an adjustment pattern, such that a user can input the amended adjustment parameter into the adjustment apparatus according to the status of the image distortion. Then, the adjustment apparatus immediately projects the amended adjustment parameter to the non-vertical surface again as a new image, such that the user may further amend the adjustment parameter according to the result of the projection until the user is satisfied. Finally, the adjustment parameter is stored in the adjustment apparatus for facilitating a next adjustment.

However, in U.S. Pat. No. 5,465,121, only the parameter about the non-vertical projection can be adjusted. However, for the present developed ultra-thin projection displays, in view of the manufacturing of the relative elements and the manufacturing cost, the display may generate specific patterns of image distortions different from the conventional technology. The specific patterns of image distortions include multi-order curve distortions in addition to different sizes and properties of different blocks. Therefore, when a user uses the adjustment apparatus provided by the conventional technology, though an image projected to a non-vertical surface can be adjusted to have a fine adjustment effect, only the distortion caused by non-vertical projection can be adjusted, while the image distortions caused by higher-order curves cannot be adjusted.

SUMMARY OF THE INVENTION

Accordingly, the present invention is directed to provide an image adjustment circuit, a rear projection display, and a method for adjusting images, thereby adjusting image distortions of displays due to higher-order curves.

The image adjustment circuit provided by the present invention is applicable for a projection display. The image adjustment circuit comprises a parameter input unit, a data buffer unit, and a geometry transfer unit. The parameter input unit is used to provide a vertical axis amendment parameter and a horizontal axis amendment parameter. The data buffer unit is coupled to the parameter input unit for buffering the vertical axis amendment parameter and the horizontal axis amendment parameter. The geometry transfer unit is used to receive input frame data with a plurality of pixels. Then, the vertical axis coordinate of each pixel multiplies the vertical axis amendment parameter, thereby transferring each of the pixels to a new vertical axis coordinate. The horizontal axis coordinate of each pixel multiplies the horizontal axis amendment parameter, thereby transferring each of the pixels to a new horizontal axis coordinate.

In the embodiment of the present invention, the projection display is, for example, a rear projection display.

From another point of view, the present invention provides a rear projection display which comprises an image input interface, a resolution adjustment circuit, and an image adjustment circuit. The image input interface is used to receive input image data with a plurality of pixels. The resolution adjustment circuit is coupled to the image input interface for adjusting the resolution of the input image data. The image adjustment circuit is coupled to the resolution adjustment circuit, so that the vertical axis coordinate of each pixel of the input image data multiplies the vertical axis amendment parameter, thereby transferring each pixel to a new vertical axis coordinate; and the horizontal axis coordinate of each pixel multiplies the horizontal axis amendment parameter, thereby transferring each pixel to a new horizontal axis coordinate.

In another embodiment of the present invention, the rear projection display further comprises a panel drive circuit and a display panel, wherein the panel drive circuit generates output image data according to the output of the image adjustment circuit and the display panel displays the output image data for users to watch.

In one preferred embodiment of the present invention, the image adjustment circuit of the rear projection display further comprises a parameter input unit, a data buffer unit, and a geometry transfer unit. The parameter input unit is used to provide a vertical axis amendment parameter and a horizontal axis amendment parameter. The data buffer unit is coupled to the parameter input unit for buffering the vertical axis amendment parameter and the horizontal axis amendment parameter. The geometry transfer unit is used for multiplying the vertical axis coordinate of each pixel with the vertical axis amendment parameter, and multiplying the horizontal axis coordinate of each pixel with the horizontal axis amendment parameter.

From another point of view, the present invention provides a method for adjusting images, which is also applicable to a projection display. The method for adjusting images of the present invention comprises first measuring the distortion of the output image of a projection display; providing a vertical axis amendment parameter and a horizontal axis amendment parameter; receiving input image data with a plurality of pixels; the vertical axis coordinate of each pixel multiplies the vertical axis amendment parameter and the horizontal axis coordinate of each pixel multiplies the horizontal axis amendment parameter; finally, the latest vertical and horizontal axis coordinates of each pixel can be obtained, thereby transferring the input image data to the amended image data.

The present invention provides a circuit and a method for adjusting images for amending each pixel of the distorted image data of the input image data and transmitting the amended image data to the display panel for displaying, thereby solving the problem of the image distortion of higher-order curves existing in the conventional technology, and further recovering the original image on the display completely.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

DESCRIPTION OF EMBODIMENTS

The projection display technology of a projection display is an indirect imaging technology, using a set of lenses, i.e., projection lenses to project images on a screen far away, thereby forming the picture that can be sensed by eyes after an image is generated through the imaging technologies, such as cathode ray tube (CRT) displays, liquid crystal displays (LCDs), or digital light processing (DLP) displays. Projection displays are generally classified into front projection displays and rear projection displays, which are mainly different in the direction from which people can view images on the screen. For a front projection display, people may view images in front of the screen. On the contrary, for a rear projection display, people may view images in rear of the screen, wherein a rear projection television is the most common rear projection application.

Compared with the conventional front projection display, the rear projection display is a new imaging technology and the display screen has the advantages of high contrast, high uniformity, high resolution, ambient light resistance, and so on, thereby becoming the best choice for the viewers at present. According to the display principle of the rear projection display, a projector is placed in rear of the screen for projecting images to the screen from the rear end. Therefore, the rear projection display can resist ambient lights well and have good contrast, thereby providing favorable quality either indoors or outdoors.

Figure 1:
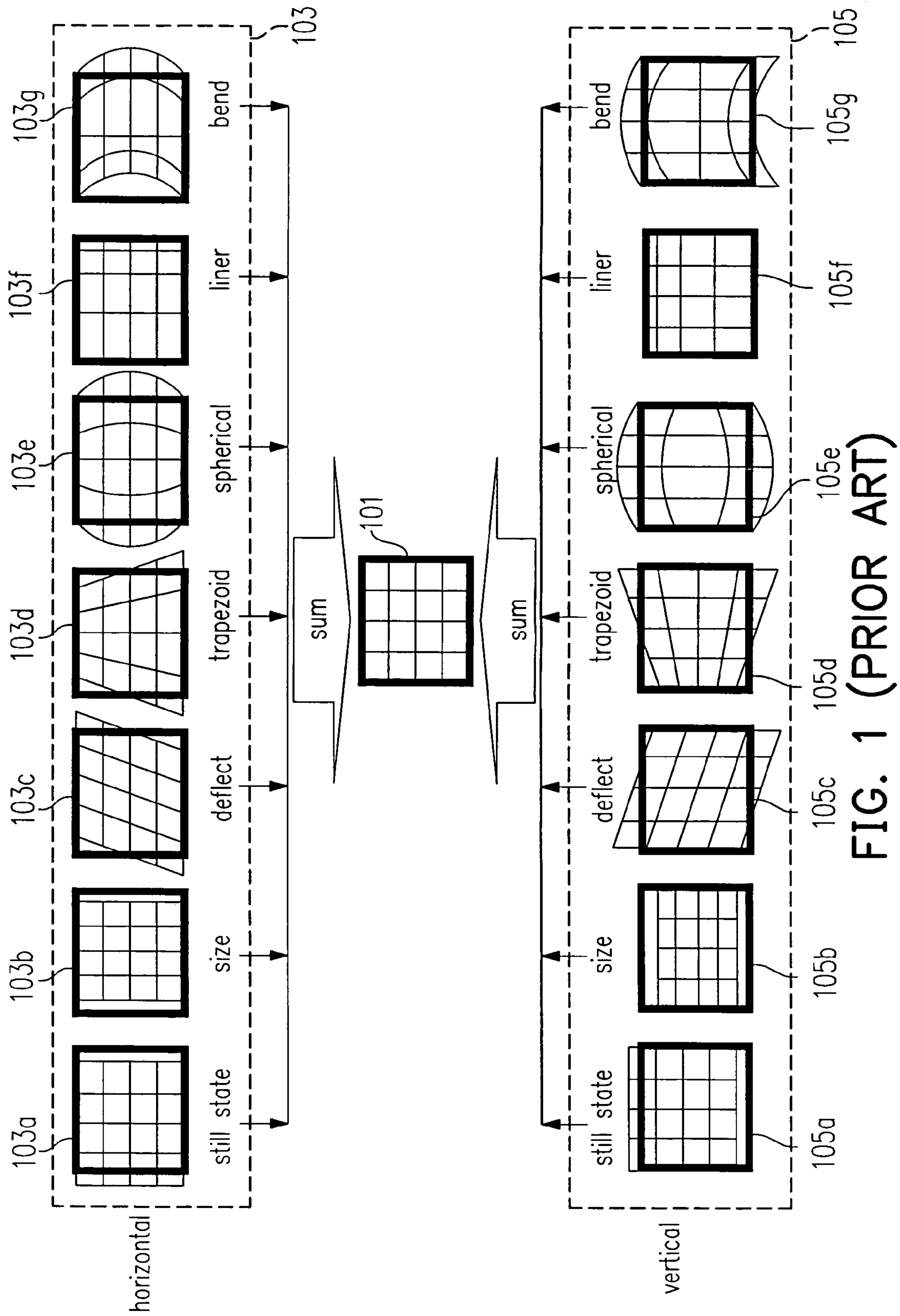
FIG. 1 (PRIOR ART)
FIG. 1 is a schematic view of the pattern of an image distortion of a conventional display.
Figure 2:
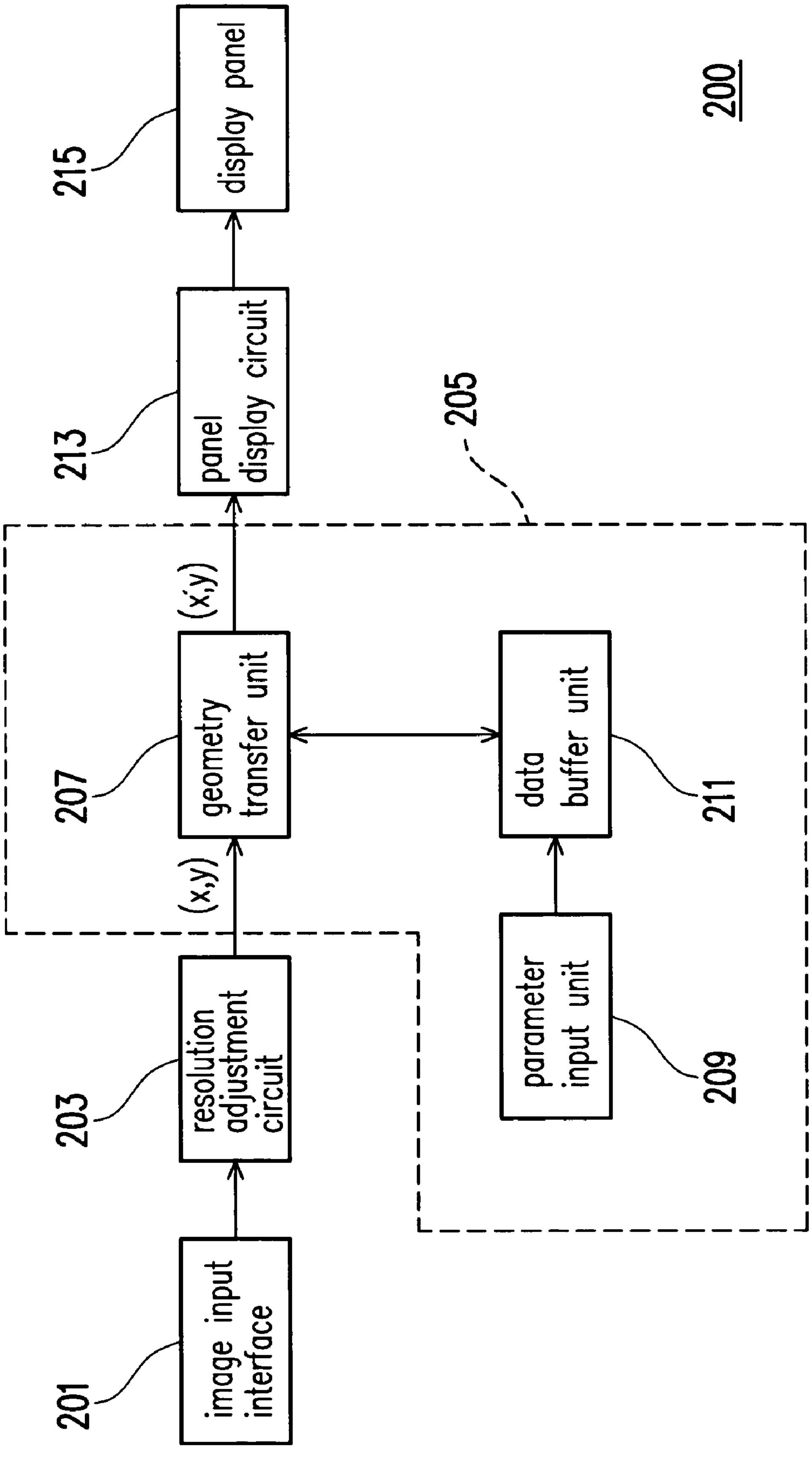
FIG. 2 shows a rear projection display according to one preferred embodiment of the present invention.

FIG. 2 shows a rear projection display according to one preferred embodiment of the present invention. With reference to FIG. 2, the rear projection display 200 of the present invention comprises an image input interface 201, a resolution adjustment circuit 203, and an image adjustment circuit 205. The image input interface 201 is used for receiving input image data with a plurality of pixels. The resolution adjustment circuit 203 is coupled to the image input interface 201 for adjusting the resolution of the input image data received by the image input interface 201. The image adjustment circuit 205 is used to receive the input image data adjusted by the resolution adjustment circuit 203. Then, the vertical axis coordinate of each pixel of the input image data multiplies a vertical axis amendment parameter, thereby transferring each pixel to a new vertical axis coordinate; and the horizontal axis coordinate of each pixel multiplies a horizontal axis amendment parameter, thereby transferring each pixel to a new horizontal axis coordinate.

It is well known that the rear projection display 200 further comprises a panel drive circuit 213 and a display panel 215. The panel drive circuit 213 is used to receive the image data adjusted by the image adjustment circuit 205 and generate output image data to the display panel 215. Then, the display panel 215 displays the output image data for viewers. Additionally, only the aforementioned elements are disclosed in FIG. 2, those skilled in the art should know that the rear projection display 200 further comprises various sets of lenses, projection lenses, and so on.

The image adjustment circuit 205 comprises a parameter input unit 209, a data buffer unit 211, and a geometry transfer unit 207. The parameter input unit 209 is used to provide the vertical axis amendment parameter and the horizontal axis amendment parameter. The data buffer unit 211 is coupled to the parameter input unit 209 for buffering the vertical axis amendment parameter and the horizontal axis amendment parameter. The geometry transfer unit 207 is used to receive input frame data with a plurality of pixels. Then, the vertical axis coordinate of each pixel multiplies the vertical axis amendment parameter, thereby transferring each pixel to a new vertical axis coordinate; and the horizontal axis coordinate of each pixel multiplies the horizontal axis amendment parameter, thereby transferring each pixel to a new horizontal axis coordinate.

Projection displays are commonly classified into front and rear projection displays. The rear projection display 200 is taken as an example to illustrate the image adjustment circuit 205 provided by the present invention below. Those skilled in the art may easily implement the spirit of the invention to the front projection display.

Figure 3A:
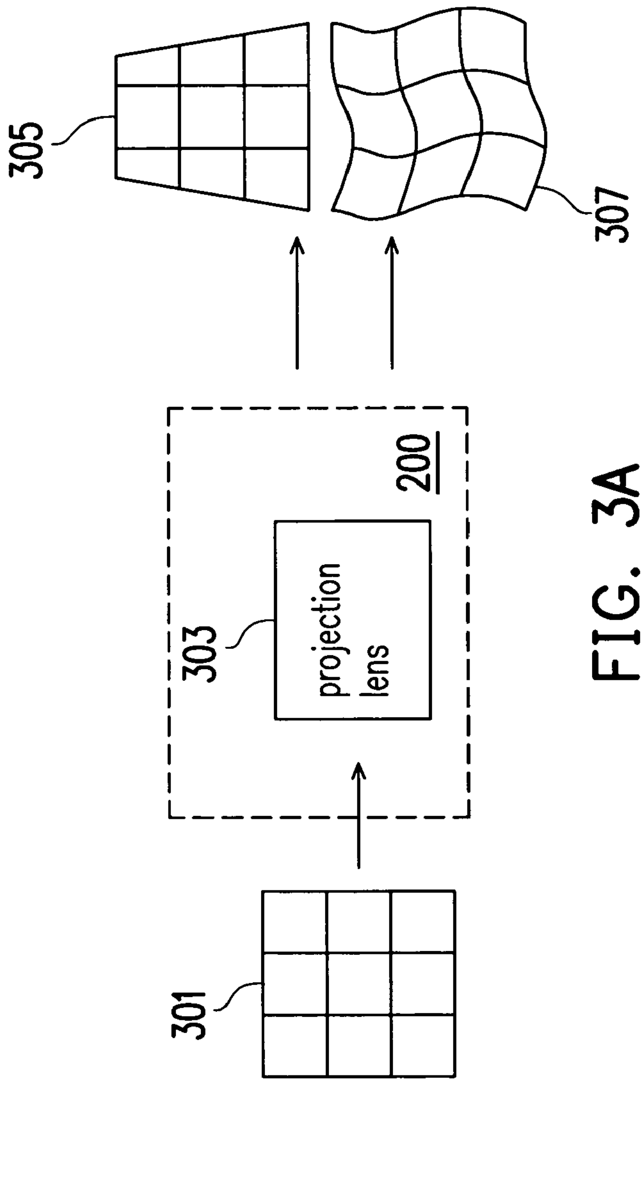
FIG. 3A is a schematic view of the pattern of a projected image distortion.

FIG. 3A is a schematic view of the pattern of a projected image distortion. With reference to FIGS. 2 and 3A, when the image input interface 201 receives input image data, for example, square image data 301, and after the input image data is projected by the projection lens 303 of the rear projection display 200, distorted image data 305, such as trapezoid image data, may be generated for viewers. However, the pattern of the image distortion is not limited to the image distortion caused by non-vertical projection but also includes the image distortion 307 caused by multi-order curves. Further, the image distortion 307 caused by multi-order curves cannot be solved through the conventional technology. Therefore, the present invention provides an apparatus and a method of the image adjustment circuit to amend the image distortion 307 caused by higher-order curves.

Figure 3B:
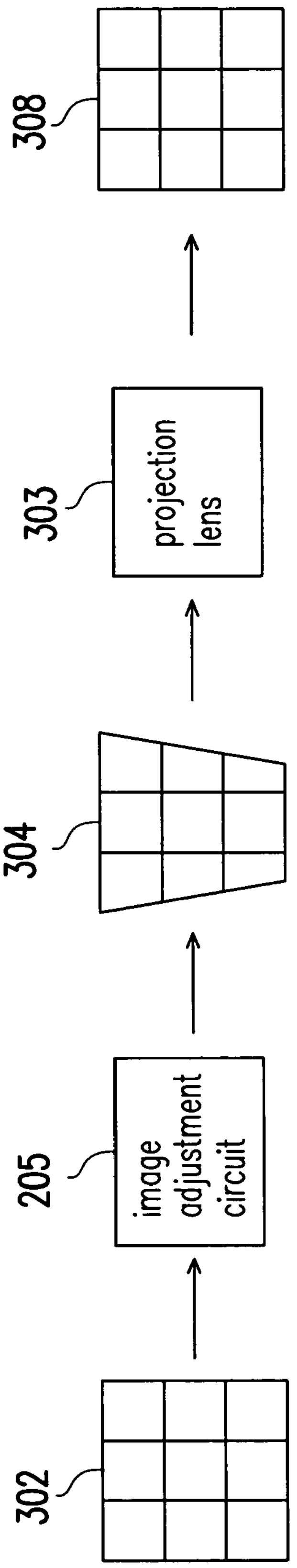
FIG. 3B is a schematic view of adjusting the projected image according to the embodiment.

FIG. 3B is a schematic view of adjusting projected images according to the embodiment. With reference to FIGS. 2, 3A, and 3B, the present invention employs the image adjustment circuit 205 for deforming the input image data once, such as a square image data 302 to a trapezoid image data 304. Then, the projection lens 303 of the rear projection display 200 is used to project and deform and then amend the distortion of the image data to the original square image data 308 for viewers to watch. Therefore, when a user intends to adjust an image through the present invention, a rapid look-up table is used between the geometry transfer unit 207 and the data buffer unit 211 in the image adjustment circuit 205.

When the image is transmitted, each pixel is transmitted in sequence in accordance with the CLOCK speed controlled by the timing controller of the rear projection display 200. Therefore, the column and row of the image the received pixel data are in i.e., the coordinates (x, y) of the pixel data can be known through calculating the time sequence. Then, through the amendment parameter comparison table of the parameter input unit 209 received by the data buffer unit 211 in the image adjustment circuit 205, which column and row of the new image the pixel data are in, i.e., the coordinates (x', y') of the corresponding pixel data can be known.

Next, the coordinates (x', y') of the corresponding pixel data are stored in the data buffer unit 211 by the user. As such, when the image adjustment circuit 205 receives a signal for changing an image frame, the memory data stored in the data buffer unit 211 is transmitted to the panel drive circuit 213, such that the display panel 215 displays the image data for users to watch.

In the embodiment, the image adjustment circuit 205 may finish adjusting images in a time period of changing a frame. Further, since the image adjustment circuit 205 deforms the input image data first for obtaining the coordinates (x', y') of the corresponding transferred pixel data for calculating the coordinates (x, y) of each pixel of the input image data, and then the distorted image is deformed and amended by the projection lens for users to watch. Therefore, the present invention can be used to amend the image distortion caused by higher-order curves in addition to the image distortion caused by non-vertical projection, without affecting the display speed of the rear projection display 200.

The rapid look-up method between the geometry transfer unit 207 and the data buffer unit 211 can be used to calculate the coordinates (x', y') of the corresponding image data through the following two formulas depending on the coordinates (x, y) of the pixel data, wherein the coordinates (x, y) of the pixel data are obtained according to the timing sequence generated by the timing controller in the rear projection display 200:

$$x' = f(x, y) = \sum_{i=0}^{n}\sum_{j=0}^{n-i} A_{ij}x^i y^j$$

-continued $$y' = g(x, y) = \sum_{i=0}^{n}\sum_{j=0}^{n-i} B_{ij}x^i y^j$$

The coefficients $A_{ij}$ and $B_{ij}$ in the formulas are provided by the parameter input unit 209. The coordinates (x, y) of the pixel data and the coordinates (x', y') of the corresponding pixel data are generated and applied in the geometry transfer unit 207. Therefore, all of the system parameters are obtained when the coefficients $A_{ij}$ and $B_{ij}$ provided by the parameter input unit 209 are obtained and then the coordinates (x', y') of the corresponding pixel data are obtained for adjusting the output image of the rear projection display 200.

In the embodiment, the coefficients $A_{ij}$ and $B_{ij}$ in the formulas are determined as follows. M coordinates (x1, y1) . . . (xm, ym) of the pixel data are sampled from the edge contour of the rear projection display 200 as samples, thereby determining the linear regression equation $y=C_1x+C_0$, wherein $C_0$ and $C_1$ are coefficients, and x and y are variables. Next, the error function equation $\tilde{y}=C_1x+C_0$ of the coordinates of the sampled pixel data is defined, wherein $C_0$ and $C_1$ are coefficients, and x and y are variables. The sum squared error formula is determined as:

$$S = \sum_{i=1}^{m}(y_i - \tilde{y})^2 = \sum_{i=1}^{m}(y_i - (C_1x_i + C_0))^2.$$

Then, the sum squared error formula is used to calculate the coefficients $C_0$ and $C_1$ in the linear regression equation and error function equation in order to minimize the sum squared error s. The solving process of the sum squared error is listed below. Firstly, the partial differential of the coefficient $C_0$ is calculated through the sum squared error, as shown below:

$$\frac{\partial S}{\partial C_0} = \sum_{i=1}^{m} 2(y_i - C_0 - C_1x_i)(-1) = 0,$$

and then the following equation is obtained:

$$mC_0 + C_1\sum_{i=1}^{m} x_i = \sum_{i=1}^{m} y_i. \quad \text{(equation 1)}$$

Next, the partial differential of the coefficient $C_1$ is calculated, as shown below:

$$\frac{\partial S}{\partial C_1} = \sum_{i=1}^{m} 2(y_i - C_0 - C_1x_i)(-x_i) = 0,$$

and then the following equation is obtained:

$$C_0\sum_{i=1}^{m}x_i + C_1\sum_{i=1}^{m}x_i^2 = \sum_{i=1}^{m}x_iy_i. \qquad \text{(equation 2)}$$

Finally, according to the equations 1 and 2, the coefficients $C_0$ and $C_1$ are displayed through a mathematical matrix, as shown below:

$$\begin{bmatrix} C_0 \\ C_1 \end{bmatrix} = \begin{bmatrix} m & \sum_{i=1}^{m}x_i \\ \sum_{i=1}^{m}x_i & \sum_{i=1}^{m}x_i^2 \end{bmatrix}^{-1} \begin{bmatrix} \sum_{i=1}^{m}y_i \\ \sum_{i=1}^{m}x_iy_i \end{bmatrix}$$

As such, according to the solving process, the coefficients $A_{ij}$ and $B_{ij}$ provided by the parameter input unit 209 are obtained.

It is well known that the speed and resolution of the signal transmitted to the display panel are fixed values because most of the present panels have fixed resolutions. The signals in different formats are adjusted to the circuit signals accepted by the display panel 215 through the resolution adjustment circuit 203. Therefore, in the present invention, it is most effective to place the geometry transfer unit 207 between the resolution adjustment circuit 203 and the panel drive circuit 213 to transfer pixel data.

Figure 4:
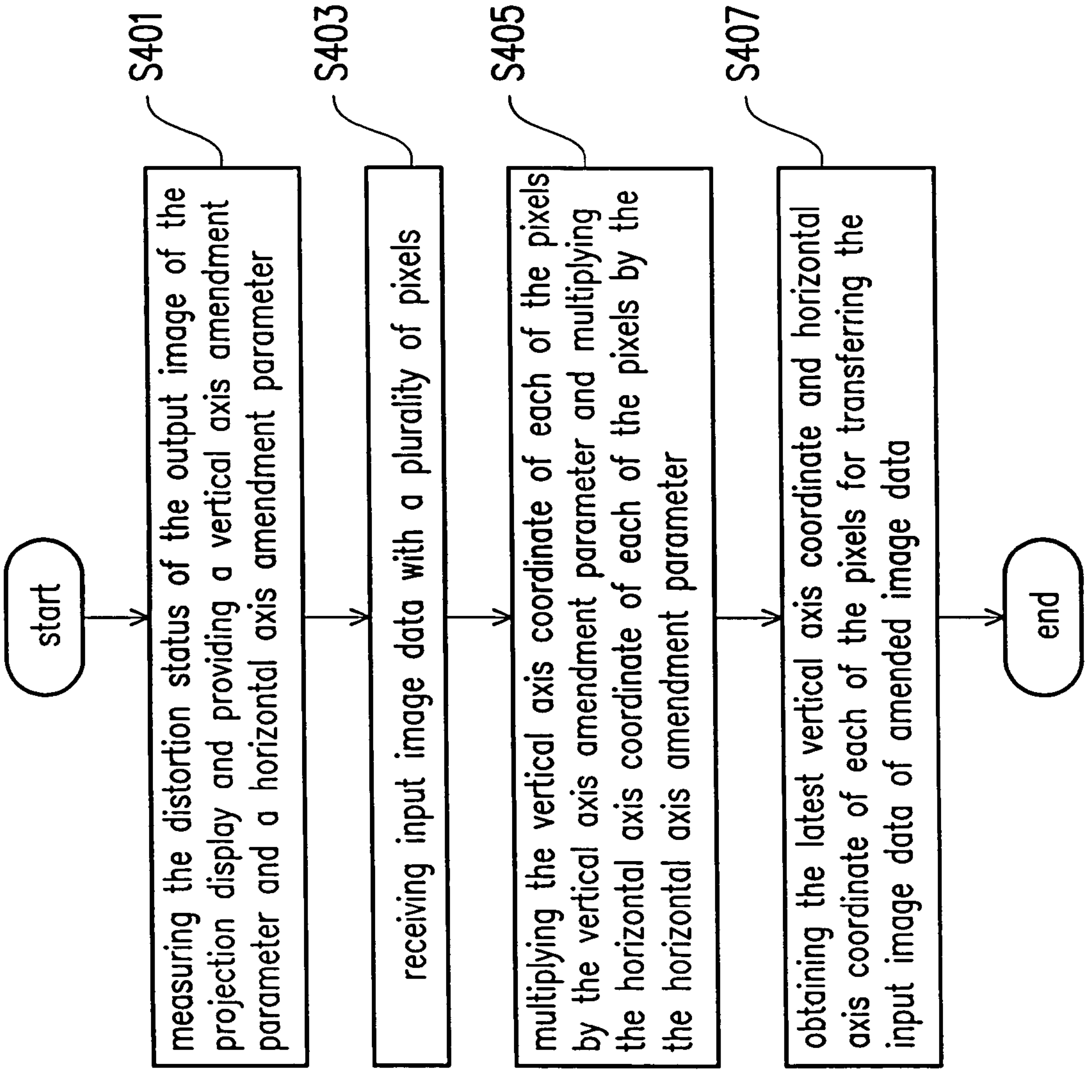
FIG. 4 is a flow chart of the method for adjusting images according to the embodiment.

FIG. 4 is a flow chart of the method for adjusting images according to the embodiment. The method of the present invention comprises measuring the distortion status of the output image of the projection display and providing a vertical axis amendment parameter and a horizontal axis amendment parameter (Step S401); receiving the input image data with a plurality of pixels (Step S403); then, multiplying the vertical axis coordinate of each pixel by the vertical axis amendment parameter and multiplying the horizontal axis coordinate of each pixel by the horizontal axis amendment parameter (Step S405); and finally, obtaining the latest vertical and horizontal axis coordinates of each pixel for transferring the input image data to the amended image data (Step S407).

In view of the above, the present invention provides a circuit and a method for adjusting images. According to the spirit of the present invention, the present invention has the following advantages.

1. The corresponding mode can be established rapidly and completely through the look-up table employed in the present invention.

2. The amendment parameter comparison table can be obtained rapidly.

3. The standard signal interface is employed, which is placed at the end of resolution adjustment circuit and the panel drive circuit and has preferable compatibility. Thereby, the present invention can be used to amend the image distortion caused by higher-order curves in addition to the image distortion caused by non-vertical projection, without affecting the display speed of the rear projection display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image adjustment circuit suitable for a projection display, comprising:

a parameter input unit, for providing a vertical axis amendment parameter and a horizontal axis amendment parameter;

a data buffer unit, coupled to the parameter input unit for buffering the vertical axis amendment parameter and the horizontal axis amendment parameter; and a geometry transfer unit, for receiving input frame data with a plurality of pixels, wherein through the geometry transfer unit, the vertical axis coordinate of each of the pixels multiplies the vertical axis amendment parameter, thereby transferring each of the pixels to a new vertical axis coordinate, and the horizontal axis coordinate of each of the pixels multiplies the horizontal axis amendment parameter, thereby transferring each of the pixels to a new horizontal axis coordinate, wherein the vertical axis amendment parameter and the horizontal axis amendment parameter are determined by a linear regression equation of M coordinates of a plurality of pixel data, the M coordinates of the pixel data are sampled from the edge contour of the projection display.

2. The image adjustment circuit as claimed in claim 1, wherein the projection display includes a rear projection display.

3. A rear projection display, comprising:

an image input interface, for receiving input image data with a plurality of pixels;

a resolution adjustment circuit coupled to the image input interface for adjusting the resolution of the input image data; and an image adjustment circuit coupled to the resolution adjustment circuit for multiplying the vertical axis coordinate of each of the pixels by a vertical axis amendment parameter, thereby transferring each of the pixels to a new vertical axis coordinate, and multiplying the horizontal axis coordinate of each of the pixels by a horizontal axis amendment parameter, thereby transferring each of the pixels to a new horizontal axis coordinate, wherein the vertical axis amendment parameter and the horizontal axis amendment parameter are determined by a linear regression equation of M coordinates of a plurality of pixel data, the M coordinates of the pixel data are sampled from the edge contour of the rear projection display.

4. The rear projection display as claimed in claim 3, further comprising:

a panel drive circuit, for generating output image data according to the output of the image adjustment circuit; and a display panel, for displaying the output image data for users.

5. The rear projection display as claimed in claim 3, wherein the image adjustment circuit comprises:

a parameter input unit, for providing the vertical axis amendment parameter and the horizontal axis amendment parameter;

a data buffer unit, coupled to the parameter input unit for buffering the vertical axis amendment parameter and the horizontal axis amendment parameter; and a geometry transfer unit for multiplying the vertical axis coordinate of each of the pixels by the vertical axis amendment parameter and multiplying the horizontal axis coordinate of each of the pixels by the horizontal axis amendment parameter.

6. A method for adjusting images suitable for a projection display, comprising:

measuring the distortion status of the output image of the projection display and providing a vertical axis amendment parameter and a horizontal axis amendment parameter;

receiving input image data with a plurality of pixels;

multiplying the vertical axis coordinate of each of the pixels by the vertical axis amendment parameter and multiplying the horizontal axis coordinate of each of the pixels by the horizontal axis amendment parameter, wherein the vertical axis amendment parameter and the horizontal axis amendment parameter are determined by a linear regression equation of M coordinates of a plurality of pixel data, the M coordinates of the pixel data are sampled from the edge contour of the projection display; and obtaining the latest vertical axis coordinate and horizontal axis coordinate of each of the pixels for transferring the input image data to amended image data.

7. The image adjusting method as claimed in claim 6, wherein the projection display includes a rear projection display.

* * * * *